F. W. ANDREWS.
REFRIGERATING APPARATUS.
APPLICATION FILED MAY 14, 1917.
1,419,097.
Patented June 6, 1922.
6 SHEETS—SHEET 3.
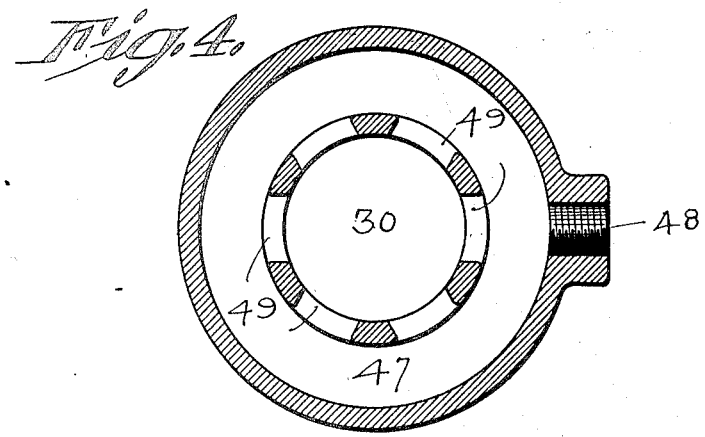
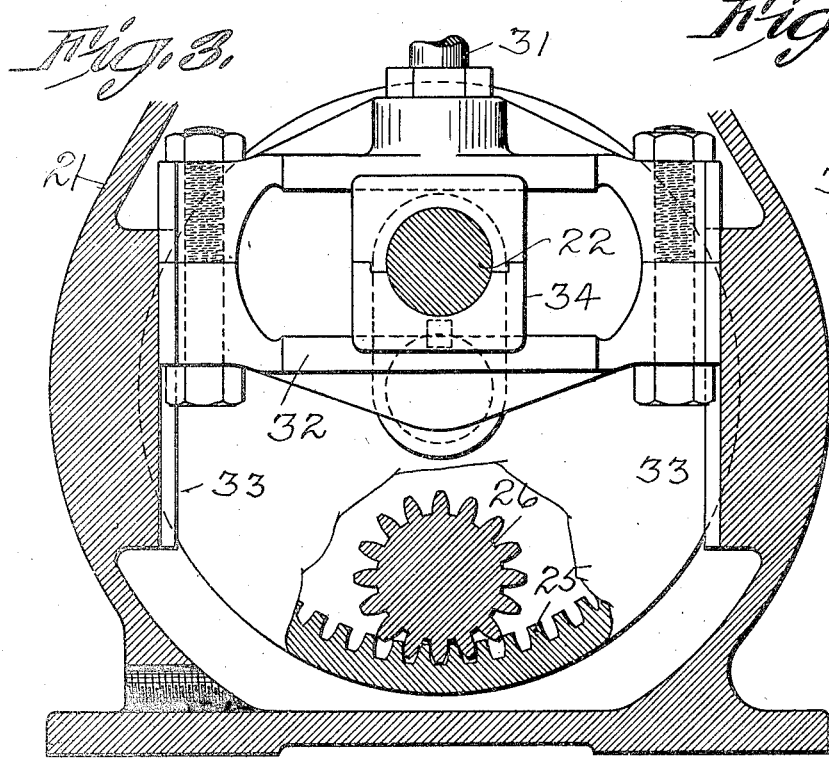
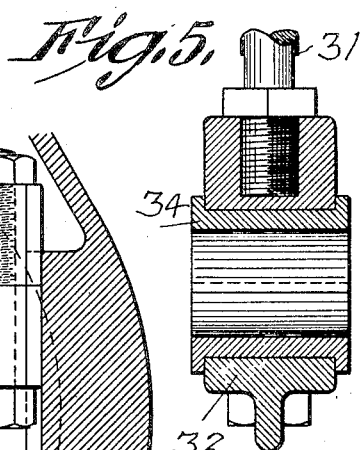
Inventor
Frank W Andrews
By H. L. Walker
Attorney
Witness
Frank Monroe
Burt H Weston

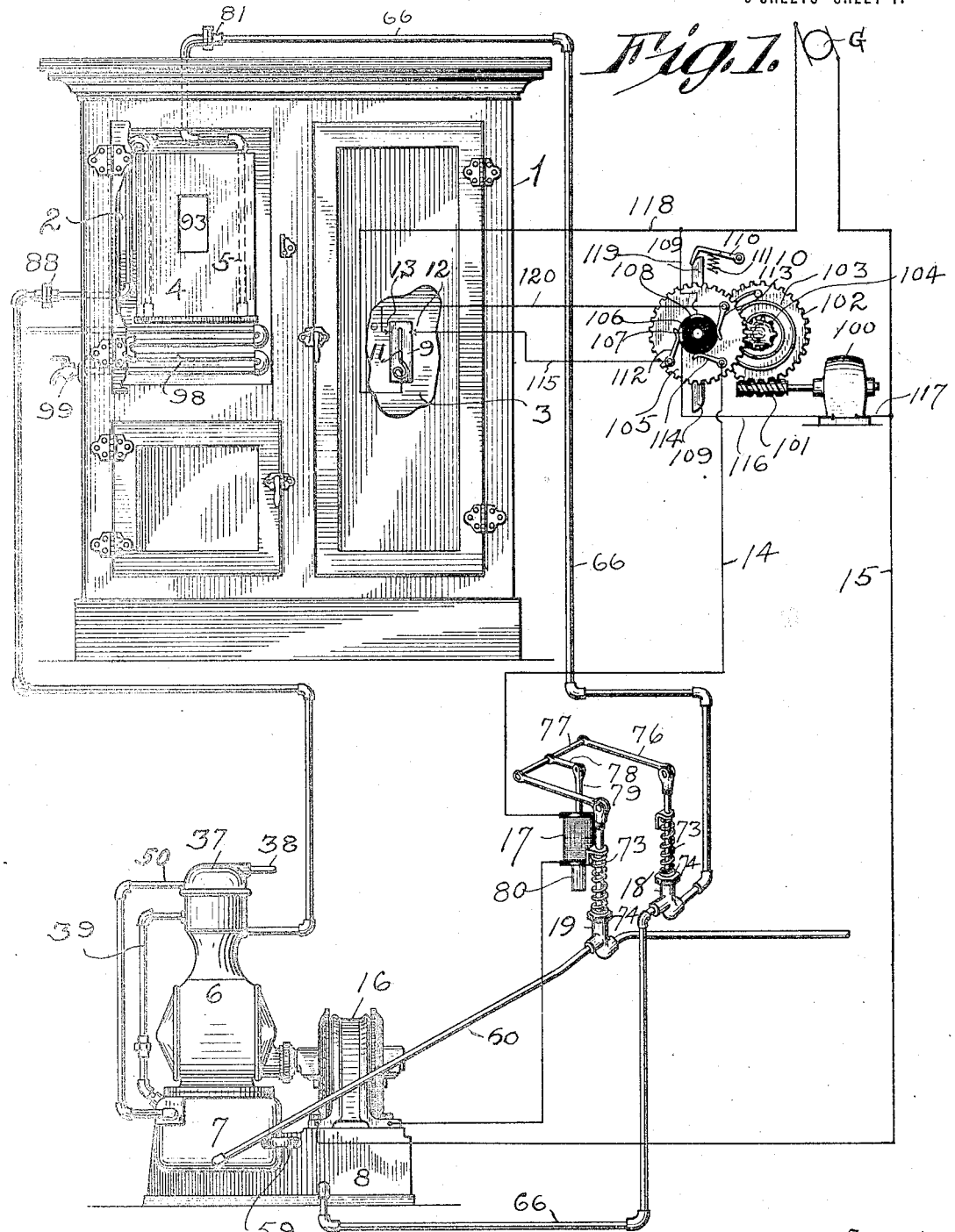

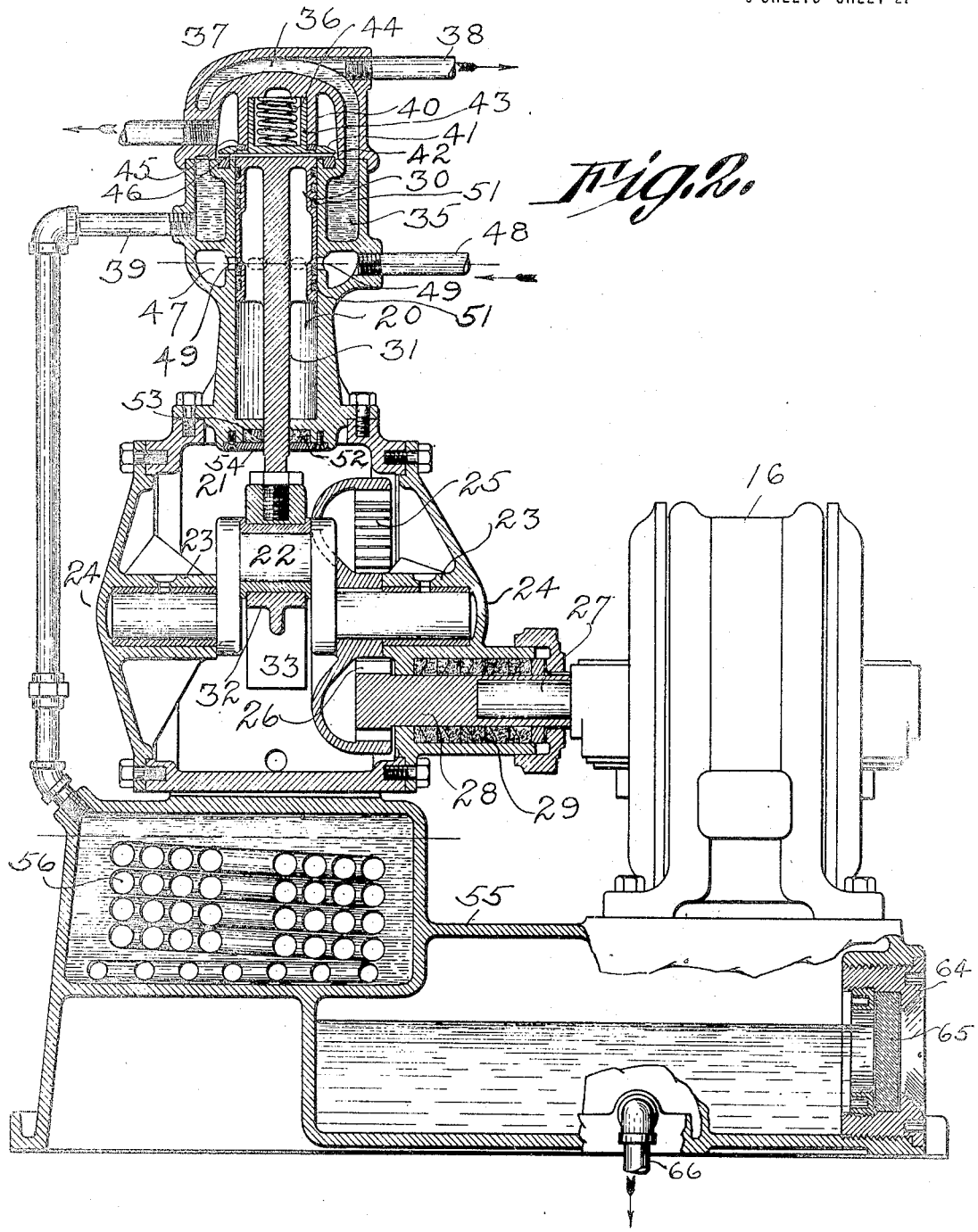

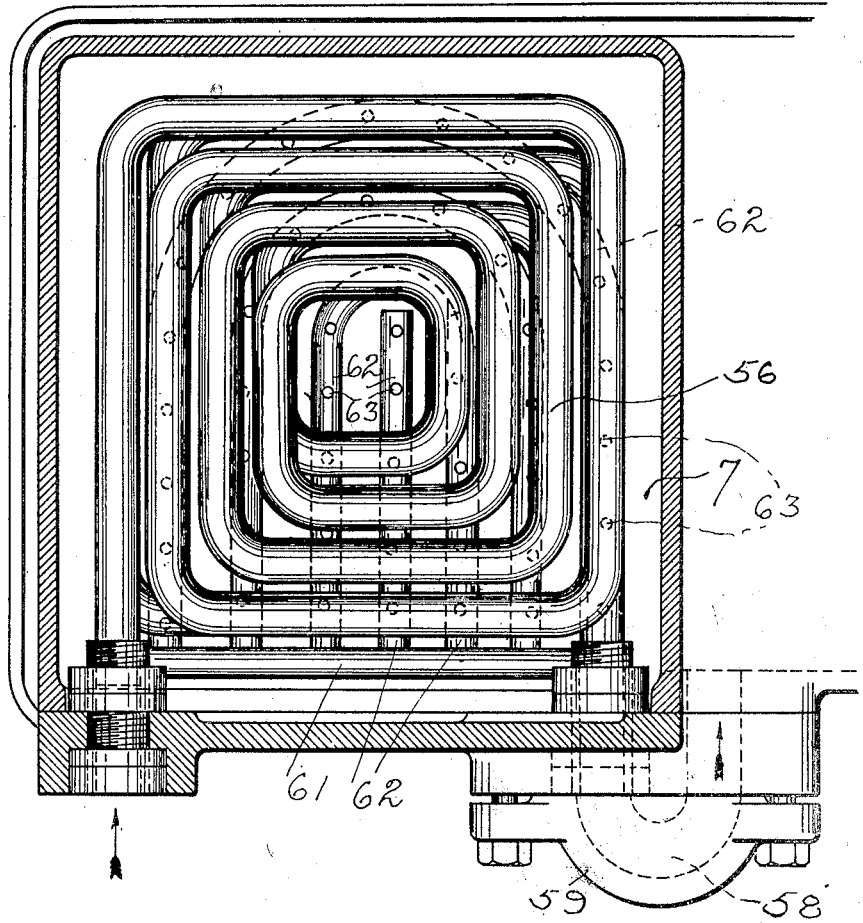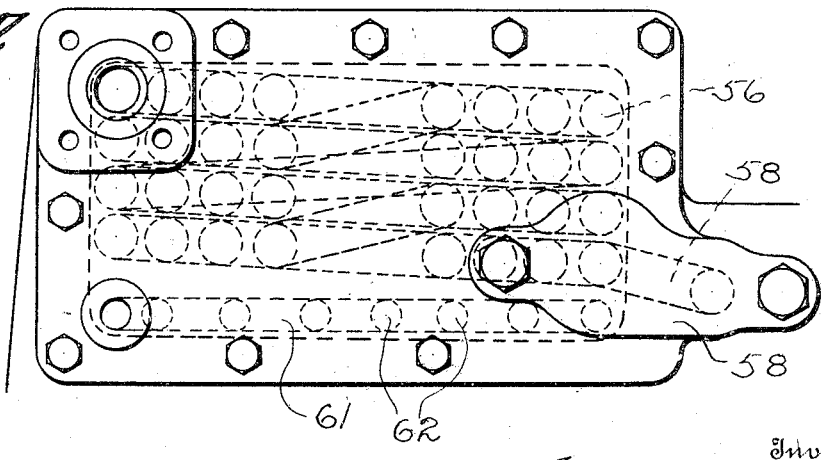

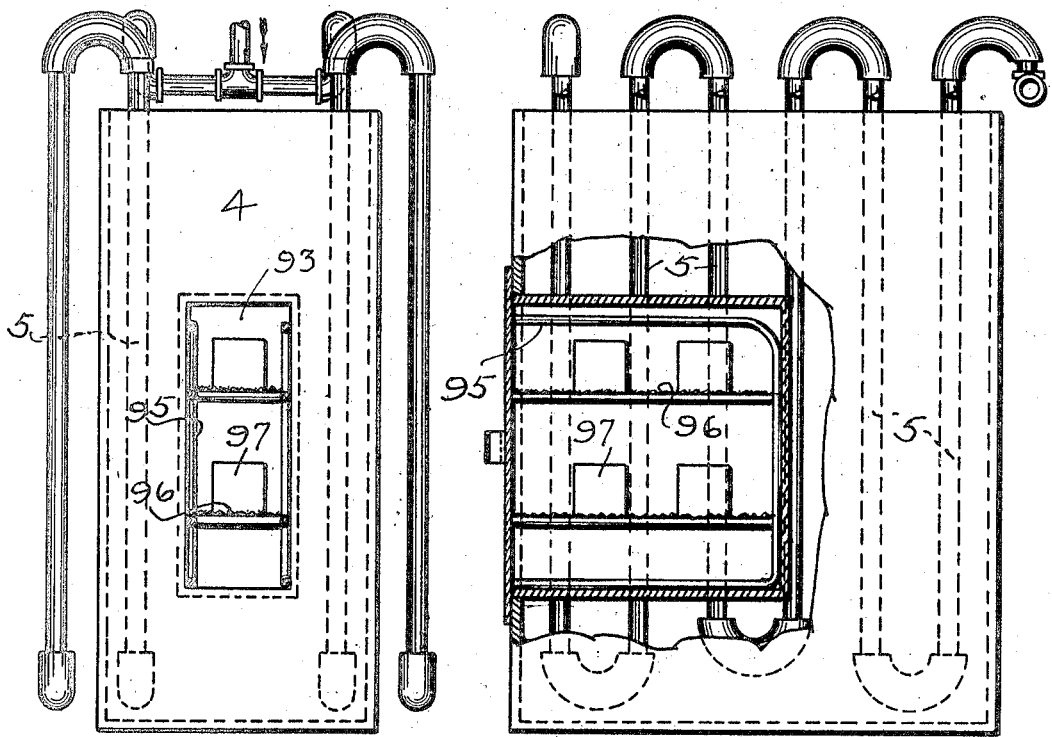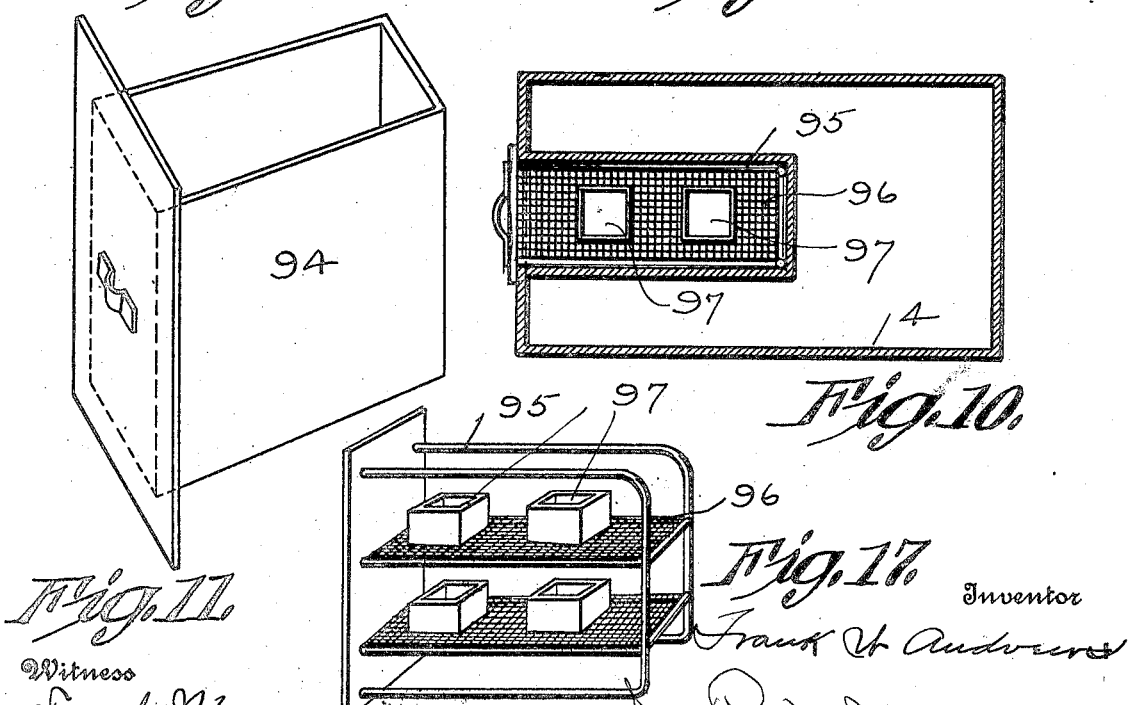

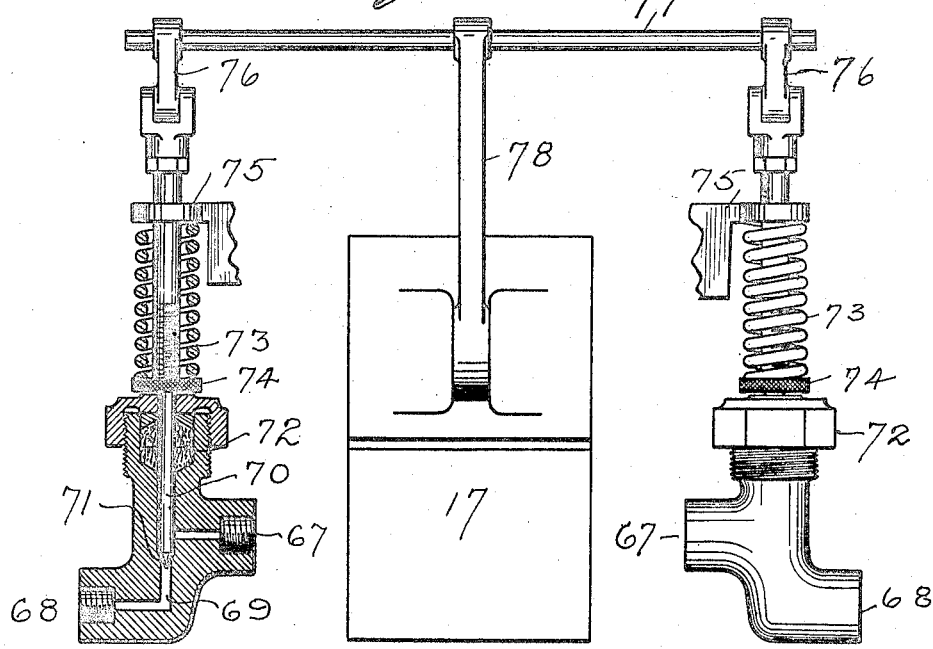

UNITED STATES PATENT OFFICE.

FRANK W. ANDREWS, OF WAPAKONETA, OHIO, ASSIGNOR, BY MESNE ASSIGNMENTS, TO THE SUPERIOR REFRIGERATING COMPANY, OF WAPAKONETA, OHIO, A CORPORATION OF OHIO.

REFRIGERATING APPARATUS.

1,419,097. Specification of Letters Patent. Patented June 6, 1922.

Application filed May 14, 1917. Serial No. 168,525.

*To all whom it may concern:*

Be it known that FRANK W. ANDREWS, citizen of the United States, residing at Wapakoneta, in the county of Auglaize and State of Ohio, have invented certain new and useful Improvements in Refrigerating Apparatus, of which the following is a specification.

My invention relates to improvements in refrigerating apparatus and more particularly to automatically operated and controlled refrigerating means of the compression type particularly adapted for small units but which may be embodied in units of larger size for use in commercial ice manufacturing establishments.

The object of the invention is to simplify the structure as well as the means and mode of operation of refrigerating apparatus, whereby it will not only be cheapened in construction but will be more efficient in use, economically operated, positive and automatic in action, universal in its application and unlikely to get out of repair.

A further object of the invention is to provide an improved form of compressor for the refrigerating medium, and to further provide a unitary structure in which the compressor, the condenser and the receiver may be embodied in a compact and convenient form.

A further object is to provide improved controlling means whereby the refrigerating apparatus is automatically started and stopped by variations of temperature at predetermined maximum and minimum limits.

A further object of the invention is to provide improved cut off means for the gas and the condensation water automatically controlled in unison with the starting and stopping of the compressor.

A further object of the invention is to provide improved form of strainer valve for the refrigerating medium line and an improved form of expansion valve through which the refrigerant is expanded into the refrigerating coil.

With the above primary and other incidental objects in view as will more fully appear in the specification, the invention consists of the features of construction, the parts and combinations thereof, and the mode of operation or their equivalents, as hereinafter described and set forth in the claims.

Referring to the drawings Fig. 1 is a general view somewhat diagrammatic of the refrigerating apparatus forming the subject matter hereof, embodied in a small unit and applied to a refrigerator such as is in common use. Fig. 2 is a vertical sectional view of the compressor for the refrigerant, illustrating further the relative location of the condenser and receiver. Fig. 3 is a detail sectional view of the cross head and driving connection of the compressor. Fig. 4 is a transverse sectional view through the annular gas inlet chamber of the compressor. Fig. 5 is a detail cross sectional view of the compressor cross head. Fig. 6 is a sectional plan view of the condenser chamber. Fig. 7 is a side elevation thereof viewed from the inlet and outlet side showing in dotted lines the relative position of the condenser coils and the spray pipe. Figs. 8 and 9 are detailed views of the brine tank illustrating an ice freezing compartment. Fig. 10 is a sectional plan of the brine tank showing the location of the compartment for freezing small ice cakes. Fig. 11 is a detail perspective view of the ice can or compartment removed from the brine tank. Figs. 12 and 13 are an end view and a longitudinal sectional view respectively, of the expansion valve through which the refrigerant is expanded into the refrigerating coil. Figs. 14 and 15 are an end elevation and a longitudinal sectional view of the strainer valve or screen unit interposed in the refrigerant line. Fig. 16 is a detail view of the condensing water and gas or refrigerant control valves adapted to be automatically operated in unison with the starting and stopping of the compressor. Fig. 17 is a perspective view of the carrier or tray for individual ice molds.

Like parts are indicated by similar characters of reference throughout the several views.

Referring to the drawings 1 is a refrigerator or cold storage box of ordinary construction of which 2 is the refrigerating or ice compartment and 3 the commodity or chill compartment. Located in the compartment 2 is the usual brine tank 4 having therein the coils 5 for the circulation of refrigerant through the body of brine or other medium for the purpose of cooling the brine.

As is usual in such systems the refrigerant after having expanded in the expansion coils 5 is conducted therefrom through the compressor 6 by which it is compressed and is discharged through a condenser 7 located in the bottom of the compressor frame in which it is condensed and thence to the receiver 8 also in the base of the compressor frame from which it is returned to the expansion coil 5 and through the brine tank 4.

The operation of the compressor 6 and the consequent circulation of the refrigerant is automatically controlled by means of a thermostat 9, located in the commodity or chill compartment 3 of the refrigerator 1 which is so adjusted that it will close an electrical circuit at the minimum and maximum degrees of temperature of the chill compartment, and by the closing of said circuit will alternately start and stop the refrigerating apparatus.

To this end there is provided an automatic electrically controlled switch 10 under the direct control of the thermostat 9.

The particular construction of the automatic switch or cutout 10 forms no part of the present invention per se. In practice an automatic electrically controlled switch cut out known as the Honeywell device now in common use for regulating furnaces and heating apparatus generally has been very successfully employed. The thermostat 9 is so constructed that the thermostatic bar 11 constitutes a movable terminal or contact member of the initial or controlling circuit. This thermostatic contact bar 11 is adapted to make electrical contact with either one of two contact points 12 and 13 upon predetermined variations of temperature. It will be assumed that upon an increase of temperature within the compartment 3 the thermostatic bar will be caused to move toward the right, and engage the contact 12 while upon a decrease of temperature within the compartment the thermostatic contact will move towards the left and close the circuit with the contact 13.

Upon the closing of the contact between the thermal contact bar 11 and the contact 12 the automatic switch or contact will be energized by the initial or control circuit causing it to operate to automatically connect the main electric circuit through the lines 14 and 15 in which is included the driving motor 16 of the compressor and an electro magnet or solenoid 17 which controls the actuation of a cut-off valve 18 in the refrigerant conduit and a similar valve 19 in the cooling water conduit. The operation of the electro magnet or solenoid 17 upon the closing of the main line switch by the automatic cut-out 10 causes the valves 18 and 19 to open, and sets the driving motor 16 in operation. The refrigerant is then circulated through the expansion coils 5 of the brine tank 4 and back to the compressor, condenser and receiving compartment until the temperature within the chill or commodity compartment 3 of the refrigerator is reduced to the minimum limit, at which temperature the thermo contact bar 9 engages with the contact 11, thereby again energizing the automatic switch or cut-out 10 to open the main circuit and thereby disconnect the driving motor 16 and the control magnet or solenoid 17. Upon the deenergizing of the magnet or solenoid 17 the refrigerant and condensation water valves 18 and 19 are permitted to close automatically under spring pressure, and the compressor comes to rest until at such time as the temperature within the compartment 3 rises to the maximum limit whereupon the thermostat bar 9 will again operate to connect the motor 16 and electro magnet 17 into the main circuit and the operation will be repeated.

Referring now to the condenser construction illustrated in detail in Fig. 2 it will be seen that the compressor comprises a vertically disposed cylinder 20 mounted upon an enclosed hermetically sealed crank housing 21. The driving crank 22 is mounted within the closed housing 21 in inward projecting sleeves or bearing boxes 23 which are closed at the outer ends as at 24. There is mounted within the closed housing 21 upon the crank shaft 22, a driving gear 25 which in the present instance has been shown as of internal spur gear type. The purpose of employing an internal gear is to reduce the structure to as compact a unit as possible by enabling a driving pinion 26 to be located within the periphery of the drive gear 25. The drive pinion 26 is carried upon the armature shaft 27 of the electric motor 16. In the drawing the gear has been shown provided with an extended hub 28. It is obvious that the gear 26 might be mounted directly upon an extension of the armature shaft 27. The shaft 27 and hub 28 extends through a packing gland 29. This packing gland is of considerable extent and serves to prevent gas or refrigerant leakage from the housing 21. It is to be noted that the opening for the driving connection of the gear pinion 26 is the only exterior opening of the housing 21, and this opening is hermetically sealed by the packing gland 29. There is mounted within the cylinder 20 a reciprocatory piston 30 connected by a piston rod or stem 31 with the yoke 32 of a Scotch cross head mounted to reciprocate upon guides or ways 33 formed in the interior of the housing. The Scotch cross head is provided with the usual wrist pin bearing 34 sliding on the transverse ways or guides of the yoke. The construction is such that the piston 30 is reciprocated by the rotation of the crank shaft in a straight path without any lateral binding tendency. Adjacent to its upper end the cylinder 20 is surrounded by a water chamber or jacket 35. This chamber communicates with a like chamber 36 in the head 37 of the cylinder. The chamber 36 is provided with a waste outlet conduit 38 while the chamber 35 is provided with an inlet conduit 39 for cooling water. This water is conducted to the chambers 35 and 36 through the conduit 39 from the condenser chamber 7 hereinafter referred to. Formed in the interior of the head 37 is an integral sleeve 40. Mounted to reciprocate within the sleeve 40 is a head 41 for the piston chamber of the cylinder 20. This head 41 which comprises the outlet valve is of greater diameter than the bore of the cylinder 20 and is adapted to seat upon a seat ring 42 of rubber, fiber, composition or other material which will provide a tight seating contact. Such seating ring not only conforms itself to the valve head but also cushions the impingement of the valve head thereby minimizing the noise of contact. This is highly desirable in residence units. In order that the valve 41 may be accurately seated it is provided with an integral bearing sleeve 43 of comparatively large diameter which is slidingly mounted within the sleeve 40 of the head 37. A retracting spring 44 located within the concentric sleeves 40 and 43 tends to seat the valve 41 upon the annular valve seat 42. The upper face of the valve 41 is provided with concentric groove 45 in which is located a collar 46 of rubber, fiber, composition or other packing material which contacts with the lower end of the pendent sleeve 40 of the head at the upward limit of movement of the valve head 41, thereby cushioning the impingement of the valve head 41 upon the bearing sleeve 40. The interengaging valve sleeves 40 and 43 are of comparatively large diameter almost as large as the bore of the cylinder itself as can be seen by referring to Fig. 2. The valve head 41 which also forms the head for the cylinder 20 is guided accurately to and from its seat upon the packing ring or seat ring 42 by said sleeves. It is to be noted that the compressor has no inlet valve.

Immediately below the water jacket or cooling chamber 35 there is provided in the wall of the cylinder an annular concentric chamber 47 with which communicates a gas inlet conduit 48. The gas inlet chamber 47 is provided with a plurality of radially disposed ports substantially equally spaced throughout the periphery of the cylinder through which the gas passes from the annular inlet chamber to the interior of said cylinder. It is to be noted that the head 30 of the piston is of such length that when the piston is at the upper end of its stroke it extends beyond the inlet ports 49 of the gas inlet chamber, thereby effectively closing said ports. A gas outlet conduit 50 leads from the interior chamber of the head 37 above the plane of the valve head 41.

As the piston moves downward the valve head 41 is of course seated upon its seat ring 42 under the influence of its retraction spring 44. As the piston continues its downward movement it draws a partial vacuum in the upper portion of its cylinder to such extent that when it reaches the level of the gas inlet port 49, and uncovers said port the gas will rush in to fill such vacuum with great velocity and the result is equivalent to supplying gas to the compressor under an initial pressure. It has been found that the vacuum so drawn is equivalent to forcing the gas into the compressor cylinder under approximately twenty pounds pressure. By this means a greater volume of gas is handled at each operation, and the efficiency and capacity of the compressor is very materially increased. While the piston head 30 is provided with the usual piston or packing rings 51 more or less refrigerant or gas will leak past said rings to the cylinder beneath the piston head and extend to the crank housing 21. While the piston is accurately fitted to the bore of the cylinder and compression is maintained by the packing or piston rings 51 such leakage of the gas or refrigerant as may occur does no particular harm inasmuch as it cannot escape from the crank housing 21 which as before mentioned is hermetically sealed.

It will be understood that the crank housing 21 is partially filled with oil in order that the Scotch cross head by which the piston is driven may be effectively lubricated. In order to prevent the splashing of oil into the cylinder in excessive amounts, and to prevent the entrainment of oil in gas or refrigerant which may pass to and fro past the piston head during operation, and so be carried into the refrigerant discharge line, there is provided a wiping gland 52 located at the lower end of the cylinder, and surrounding the piston stem 31. This wiping gland comprises a collar 53 of felt or other yielding material, held in position by a perforate plate or collar 54. There is no attempt made to render the wiping gland 52 gas or refrigerant tight. The fact that gas or refrigerant may leak past the piston head into the crank housing 21 and the lower portion of the cylinder 20, tends to equalize to some extent the pressure on opposite sides of the piston head, and facilitates the ease of operation.

The gas outlet conduit 50 leads from the compressor head 37 to the condenser chamber 7 which is formed in the base 55 upon which the compressor 6 and its driving motor 16 are supported. The base 55 is divided into two chambers or compartments, the condenser chamber 7 and the receiving chamber 8. The condenser chamber 7 is situated at a higher level than the receiving chamber 8, as clearly indicated in Fig. 2. The refrigerant which is then in liquid form readily drains by gravity from the condenser chamber 7 to the receiving chamber 8. Located within the condenser chamber 7 is a succession of coils in the condenser pipe or tube 56 with the initial end of which the gas conduit communicates. The outlet of the condenser coil communicates with the reverse end of conduit 58 with the cap 59 secured to the base 55. The conduit 58 through said cap or head 59 forms an intercommunicating conduit between the condenser chamber 7 and the receiver.

Located within the condenser chamber 7 below the plane of the condensing coils 56 is a water supply head comprising a transversely arranged water conduit 61 from which extends a plurality of perforated pipes or tubes 62. The pipes 62 are preferably arch-shaped as shown by dotted lines in the top plan view Fig. 6, and are provided at their upper sides with a series of small perforations 63 through which numerous jets of water are discharged upward. It will be understood that the condenser chamber 7 is normally completely filled with water in which the condenser coils 56 are submerged. The purpose of the spray or jet head for the cooling water is to distribute the water equally throughout the chamber 7 to secure more thorough and uniform circulation and to further insure all parts of the condensation coil 56 being reached by the cold water circulated through the chamber 7. This cooling water is conducted to the spray head or distributer in the bottom of the condenser chamber 7 through a water supply conduit 60 leading from any suitable source, such as a city water main, a tank, pump or other supply means. Located in this supply conduit 60 is the automatic control valve 19 before mentioned. So long as the valve 19 is maintained closed which is its normal condition, no water of course can pass through the supply conduit 60 for circulation through the condenser chamber 7 and the cooling jacket or chamber 35 of the cylinder. However, upon the automatic operation of the control apparatus which causes the solenoid 17 to open the water supply valve 19, the supply of cold water is circulated through the condenser chamber 7 around the condenser coils 56 thence from the chamber 7 through a conduit 39 before mentioned, which leads from the chamber 7 to the annular or water jacket 35 of the cylinder 20. The water having passed through the chamber 35 about the cylinder and through the chamber 36 in the head 37 is discharged through the water outlet conduit 38, either as waste water or is conducted back to the tank, well, or other source of supply.

By the circulation of cold water about the condenser coil 56 within the chamber 7, the gaseous refrigerant previously compressed by the action of the piston 30 which leaves the compressor 6 in a heated condition, is cooled and condensed to a liquid form which flows from the coil 56 through the outlet or U-shaped bend 58, and is discharged into receiver 8. As indicated in Fig. 2 the condenser coils 56 are located at slight inclination whereby the refrigerant will drain through said coils to the receiver 8 by gravity.

The receiver 8 is provided at one end with a head 64 screw threaded and suitably packed, which may be removed for examination or cleansing of the interior of the receiving chamber. The movable head 64 may if so desired be provided with a transparent section 65 through which the contents of the receiving chamber may be examined to determine the quantity and condition thereof.

Leading from the receiving chamber 8 located in the base 55 of the compressor and motor to the expansion coil 5 located in the brine tank 4 within the cooling chamber 2 of the refrigerator 1 is a refrigerant supply conduit 66, in which is located the refrigerant control valve 18 before mentioned adapted to be automatically operated by the solenoid or electro magnet 17.

The construction of the water and refrigerant control valve is best shown in Fig. 16. These valves are both of the same type and are constructed and operated in the same manner hence a description of one will suffice for both. The valves are spring actuated in one direction viz to closed position, and are opened under the influence of the electro magnet or solenoid 17 against the tension of their respective retracting springs. As shown in Fig. 16 the valves are of the needle or plunger type. Each valve comprises a body or housing, forming inlet and outlet openings 67 and 68 connected by an intermediate passage 69. The fluid may be circulated through the valve body or housing in either direction, viz, from the opening 67 to 68 or vice versa. The preferred direction however is to circulate the fluid from the orifice 67 and thence through the connecting passage 69 and discharge same through the orifice 68. In Fig. 1, both methods of connections have been illustrated. The reciprocatory plunger 70 intercepts the intermediate passage 69, and engages a suitably tapered seat 71 formed therein. The stem of the plunger 70 passes through a packing gland 72 which prevents the leakage of water or refrigerant around such plunger or stem. It will be obvious that so long as the plunger 70 is depressed and in engagement with the seat 71, the passage 69 will be effectively closed, whereas upon the elevation of the plunger 70 the said passage will be opened for free circulation of fluid therethrough. Surrounding the stem of the plunger 70 is a retracting spring 73 bearing at its lower end upon an adjustable nut or head 74 screw threaded upon the stem of the plunger 70 and abutting at its upper end upon a fixed collar 75 which may form a part of the supporting structure or may be otherwise rigidly fixed. In practice the valves 18 and 19 and the controlling electromagnet 17 are preferably mounted upon one side of the compressor or motor base 55, in which event the abutment collar will be formed integral with the base 55. As thus described it will be understood that the helical spring 73 tends to keep the plungers 70 depressed or seated upon their tapered seats 71, and the intercommunicating passages 69 of the valve body is closed.

At their upper ends the stems of the plungers 70 are connected by a loose hinge connection to rock arms 76 carried upon a rock shaft 77. The rock shaft 77 also carries a third arm 78 connected by a link with the core 80 of the solenoid 17. The construction is such that whenever the main circuit including the lines 14 and 15 is closed and the solenoid 17 is energized the core 80 thereof is attracted or drawn upward thereby transmitting a rocking movement to the rock shaft 77 through the link 79 and short arm 78. The rocking movement of the shaft 77 is transmitted through the rock arm 76 to the stems of the valve plungers 70 which are thereby drawn upward against tension of the spring 73 to simultaneously open both the water and refrigerant valves 18 and 19. At the same time the motor 16 is energized to drive the compressor 6. Whenever the compressor 6 and motor 16 are arrested by the opening of the main energizing circuit 14 and 15 due to the action of the automatic switch 10, the electromagnet 17 is simultaneously deenergized thereby permitting the valves 18 and 19 to automatically close under the influence of the valve retracting springs 73.

It will be understood that the refrigerant passing through the conduit 66 from the receiver 8 and thence through the valve 18, to the expansion coils 5 is under compression. Immediately before entering the expansion coils 5 this refrigerant passes through the expansion valve 81 shown in detail in Figs. 12 and 13. This expansion valve 81 comprises two separable head portions 83 and 84 intermediate which is interposed a screen section 85 of very fine mesh. The head 84 is provided with a minute outlet port 86 while the passage 87 through the opposing head member 85 is of comparatively large size. As before stated the refrigerant is under compression throughout the conduit 66 and is discharged under pressure through the minute port 86. In entering the passage 87 of comparatively greater diameter, the refrigerant being relieved of its pressure is allowed to expand into a gaseous state which during its circulation through the expansion coil 5 submerged in the tank 4 of brine, takes up heat therefrom in the usual and well known manner. The spent refrigerant leaves said coils 5 through the conduit 48 by which it is conducted back to the intake chamber 47 of the compressor 6. Located in the return conduit 48 is a strainer valve 88 constructed somewhat similar to the expansion valve 81 but having ports of comparatively large diameter and equal size. The strainer valve 88 comprises two opposing head members 89 and 90 connected one to the other and between which there is interposed a screen section 91 of comparatively small mesh. The purpose of this screen is to collect or intercept any scale which may be dislodged from the interior of the pipes or tubes or any grease or dirt which may be collected or deposited during the passage of the refrigerant throughout the circulating system to prevent the passage of such foreign material to the compressor 6. While other forms of strainer valve may be provided or scale traps of different type may be used, the constructions shown in Figs. 14 and 15 will be found convenient and economical for small units which are intermittently operated for short periods of time. The refrigerant having completed its circuit returns to the compressor and is again compressed, passing thence through the condenser chamber 7, and is stored in the receiver 8, preparatory to being again circulated through the several conduits and coils.

The brine tank 4 is provided in its forward face with an open chamber 93, which projects within the brine tank 4, so that its walls are entirely surrounded by the brine. There is provided for insertion within the projecting chamber a box or drawer 94 formed slightly tapering which is adapted to be filled with clear water and introduced within the chamber 93 for the purpose of freezing a small cake of ice suitable for table or other use. This drawer or ice form is laterally movable into and out of the chamber 93. There is also provided for alternate use with the drawer or ice form 94 a support 95 preferably comprising superposed decks or diaphragms of coarse screen material upon which are supported a plurality of small ice forms or boxes 97. These individual ice forms may be of any shape. In the drawings they have been shown cubical. It is obvious however that they may be of any fancy shape such as heart shape, diamond shape, or in the form of pyramids or circular. Such small compartments or forms are adapted to freezing individual cakes or blocks of ice such as high ball ices or blocks for iced tea or drinks, or table use.

While the automatic switch 10 does not in itself form a part of the present invention, and as before stated any automatic switch performing the several functions before set forth may be employed, for the purpose of illustration there has been shown a simple, yet efficient and effective form of automatic switch comprising a small motor 100 upon the armature shaft of which is carried a worm gear 101 meshing with a worm wheel 102. To the worm wheel 102 is connected one end of a spiral spring 103 the opposite end of which is connected with a small gear pinion 104. The pinion 104 in turn meshes with the gear wheel 105 which carries a commutator or drum 106 having thereon separate electrical contacts 107 and 108. The gear wheel 105 is also connected with two radial outwardly disposed arms 109. Projecting into the path of the arms 109 is a spring actuated detent 110 normally drawn into the path of the arm 109 by a spring 111. Three contact fingers 112 and 113 and 114 are provided which normally engage the drum or commutator 106 and with which contacts 107 and 108 are closed by the rotation of said drum or commutator. The contact finger 112 is connected with the thermostat contact 12 by a line 115, and the contact finger 112 normally rests in engagement with the contact 107 carried by the commutator or drum. This contact 107 is connected by a line 116 with the motor 100 and thence through line 117 with the main circuit line 15 which in turn is connected with the generator G or to a city lighting system, a storage battery or any other source of electrical energy. The opposite side of this generator or source of electrical energy is connected through the line 118 with the thermal contact bar 9 of the thermostat. The arrangement of circuit is such that upon the contact of thermal bar 9 with the contact point 12 of thermostat, a circuit is closed from the generator G through the line 118 to the bar 9 thence to the contact 12, then through the line 114 to the contact finger 112 thence to the contact 107 and through the line 116 to the motor 100 from which it passes through the connection 117 to line 15 and returns thence to the generator G. This sets the motor 100 in operation, and drives the worm gear 101 to wind the spring 103. The motor continues to drive the winding wheel 102 until the tension of the spring 103 is sufficient to overcome the tension of the spring 111 of the said detent 110. At this time the detent is forced upward against the tension of its spring 111 by the cam of the stop bars 109 and the spring 103 expends its energy in a half rotation of the wheel 105 which reverses the position of the commutator of the drum 106 and brings the opposite arm 109 into engagement with the detent 110 by which the movement of the wheel 105 is arrested. The half revolution of the commutator 106 carries the contact 107 out of engagement with the contact finger 112 and into engagement with the finger 113. It will be understood that at this time the thermal bar 9 is still in contact with the point 12, hence the circuit is open between the thermal contact bar and the contact point 11. The same movement carries the contact 108 into engagement with the contact finger 114 thereby closing the main circuit from the generator G to the line 118 to the line 119 thence through the line 119 to the contact 108 which in this position of the apparatus is in engagement with the finger 114 thence through the line 14 to the electromagnet 17 and from the electromagnet 17 to the motor 16 from which it returns through the line 15 to the generator G. This drives the motor 16 and with it the compressor 6 until the circulation of the refrigerant has reduced the temperature within the refrigerator 1 to the minimum degree, at which time the thermal bar 9 makes contact with the contact point 11, thereby closing the initial or shunt circuit through the line 118 from the generator G to the thermal bar 9 thence to the contact 11, and through the line 120 to the contact 113, which in this position of the switch is in engagement with the contact 107 upon the commutator. The current passes thence through the line 116 to the motor 100 and to the connection 117 to the line 15 and thence back to the generator G thus completing a shunt circuit which operates the switching motor 100 to again actuate the gear wheel 102 to wind the spring 103 when the tension of the spring 103 exceeds that of the detent spring 111, the stop arm 109 will pass from under the detent 110 and the gear wheel 105 and commutator 106 makes another half revolution which returns the parts to the position shown in Fig. 1. This half revolution breaks the circuit through the motor 100 and at the same time carries the contact 108 away from the contact finger 114 thereby breaking the main actuating circuit through the solenoid 17 and motor 16. The opening of the main circuit deenergizes the solenoid 17 allowing the valves 18 and 19 to close and arrest the operation of the motor 16.

In Fig. 1 there has been shown immediately beneath the brine tank 4 a series of coils 98 leading from any source of water supply whereby a supply of drinking water is circulated within the cooling chamber 2 beneath the brine tank. This coil terminates in a faucet 99 by which a supply of cold water may be drawn for drinking or other purposes. If these coils were submerged within the brine tank the water would be frozen solid in the coils. However, by locating them beneath the tank the water within the coils is cooled to a very low degree but not sufficiently to cause freezing.

Having thus described my invention I claim:—

1. A refrigerating apparatus of that type wherein the refrigerating mechanism is automatically started and stopped by the action of a thermostatic control member at predetermined maximum and minimum temperatures, including a valved conduit for refrigerating media and a valved conduit for condensing media, characterized by automatic valve operating means common to the valves of both the refrigerating media and condensing media conduits.

2. A refrigerating apparatus of the type wherein the refrigerating mechanism is automatically started and stopped by the action of a thermostatic control member at predetermined maximum and minimum temperatures, including a valved conduit for refrigerating media, and a valved conduit for condensing media, characterized by a valve shifting element operatively engaged with the operative elements of the valves of both conduits, and an electromagnet operatively connected with the valve shifting element, and an electric circuit controlled by the action of the thermostatic control member for energizing said magnet.

3. A refrigerating apparatus of that type wherein a refrigerant compressor is automatically started and stopped by the action of thermostatic control member, including an electric driving motor for said compressor, a valved conduit for refrigerant and a valved conduit for condensing media, characterized by electrical operated control means common to the valved refrigerant conduit and the valved condensing media conduit, and an electric circuit the opening and closing of which is governed by the thermostatic control member, said electric motor and electrically operated control means for the valved conduits being connected in said circuit in series for simultaneous operation.

4. In a refrigerating apparatus, a thermal chamber cooled by the circulation of refrigerating media, a conduit for said refrigerant, a control valve in said conduit, a condenser for the refrigerant, a conduit for the condensing media, a valve controlling the circulation of the condensing media, electrically operated control member common to both said valves, an electric circuit controlling the operating means for said valves, and a thermostatic switch controlling the electric circuit whereby the control valve for refrigerating media and the control valve for condensing media will be alternately opened and closed in unison at the maximum and minimum variations of temperature within the thermal chamber.

5. A refrigerating apparatus of that type wherein refrigerating mechanism is automatically started and stopped by the action of a thermostatic control member, including a valved refrigerant conduit and a valved conduit for condensing media, characterized by an interconnection between the valve of the refrigerant conduit and that of the condenser media conduit, and an actuating means for the valves governed by the thermostatic control member for actuating said valves in unison.

6. In a refrigerating apparatus, a thermal chamber cooled by the circulation of refrigerating media, a compressor pump, an actuating motor therefor, a condensing chamber, a storage chamber, a circulatory conduit for the refrigerant communicating with the condensing and storage chambers, a conduit for condensing media, control valves in said refrigerant and condensing media conduits, retracting springs for said valves against the tension of which the valves are operated in one direction, and an electromagnet common to both valves adapted to simultaneously operate said valves against the tension of their springs.

In testimony whereof, I have hereunto set my hand this 5th day of May, A. D. 1917.

FRANK W. ANDREWS.

Witnesses:
 JOHN G. FAUST,
 FRANK MONROE.